(No Model.) 2 Sheets—Sheet 1.

C. LANZ.
BOLT MACHINE.

No. 589,438. Patented Sept. 7, 1897.

Witnesses:

Inventor:
Charles Lanz
By Kay & Totten
Attorneys (No Model.) 2 Sheets—Sheet 2.
C. LANZ.
BOLT MACHINE.
No. 589,438. Patented Sept. 7, 1897.
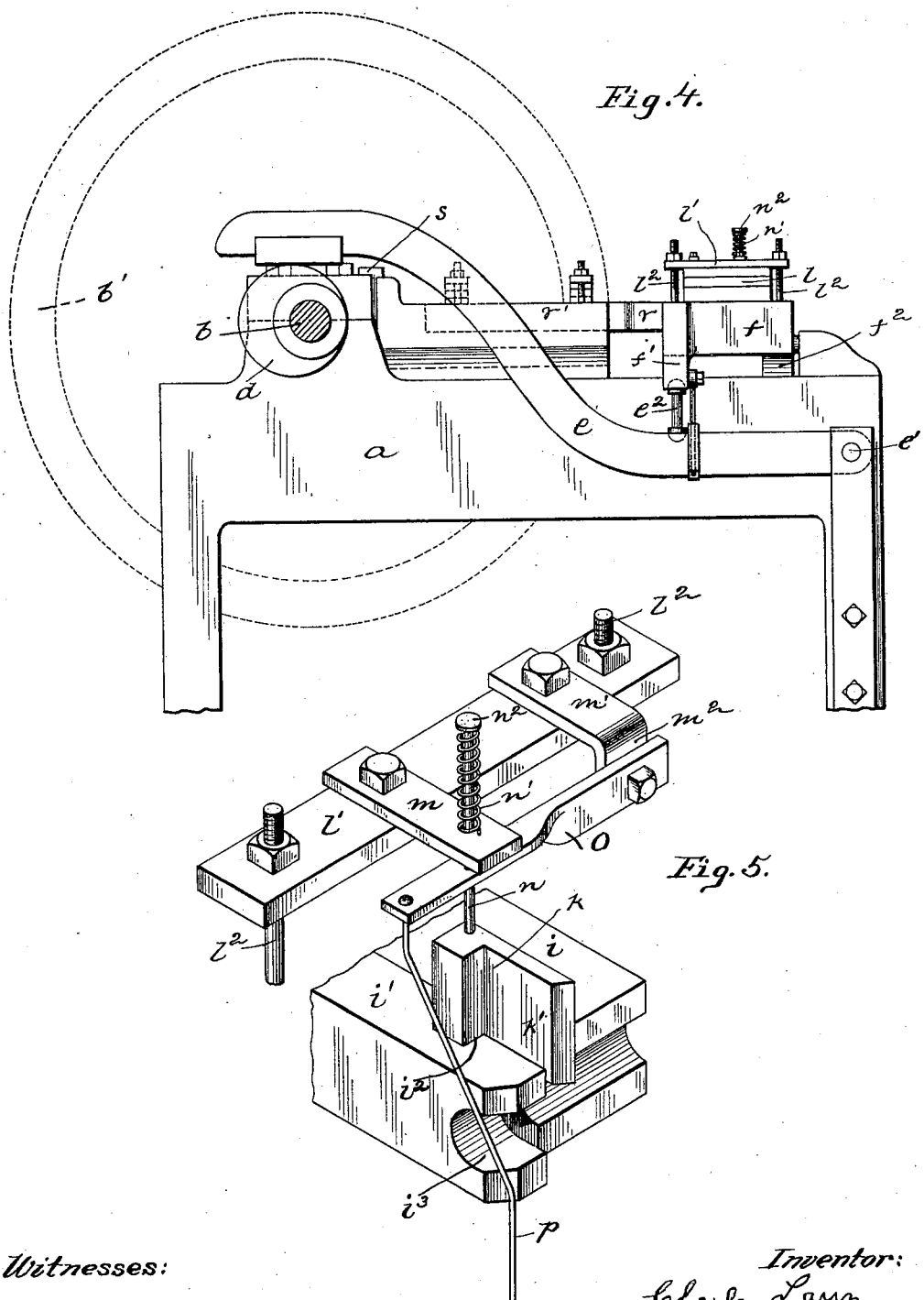
Witnesses:
Inventor:
Charles Lanz
By Kay & Totten
Attorneys

UNITED STATES PATENT OFFICE.

CHARLES LANZ, OF PITTSBURG, PENNSYLVANIA.

BOLT-MACHINE.

SPECIFICATION forming part of Letters Patent No. 589,438, dated September 7, 1897.

Application filed November 30, 1896. Serial No. 613,899. (No model.)

*To all whom it may concern:*

Be it known that I, CHARLES LANZ, a resident of Pittsburg, in the county of Allegheny and State of Pennsylvania, have invented a new and useful Improvement in Bolt-Machines; and I do hereby declare the following to be a full, clear, and exact description thereof.

My invention relates to machines for making bolts, rivets, &c.

By the method now ordinarily employed in the manufacture of bolts a long rod of iron, properly heated at one end, is fed by the operator to a pair of reciprocating dies properly recessed to form the shank of the bolt and a header adapted to form a head on the bolt. The rod is given a quarter-turn as the dies separate, so that a square head is formed on the bolt, while at the same time the shank is more perfectly and accurately formed. After the bolt has been formed at the end of the rod the rod is carried to suitable shears near by, when the finished bolt is cut off. By this transfer of the rod from the dies to the shears the end of the rod has cooled to such a degree that it is always necessary to heat it again before another bolt can be formed. This cutting of the bolt in separate shearing apparatus prevents the perfect and even shearing of the bolt, due to the fact that the shank of the bolt is not firmly supported during the shearing operation. The long rod held in the hands of the operator is fed to the shears, and in so doing the rod cannot be held so steady as to insure an even cut.

The object of my invention is to provide a machine for making bolts in which the blank may be fed to the dies and turned as said dies reciprocate, and when the bolt is formed, and while still held by the dies, said bolt may be cut from the blank without withdrawing said bolt from the machine, whereby an even and perfect cut can always be obtained.

To these ends my invention comprises, generally stated, suitable dies and a header for forming the bolt, and a movable knife normally out of action, and mechanism for bringing said knife into position to shear the bolt from the blank when desired.

To enable others skilled in the art to make and use my invention, I will describe the same more fully, referring to the accompanying drawings, in which—

Figure 1:
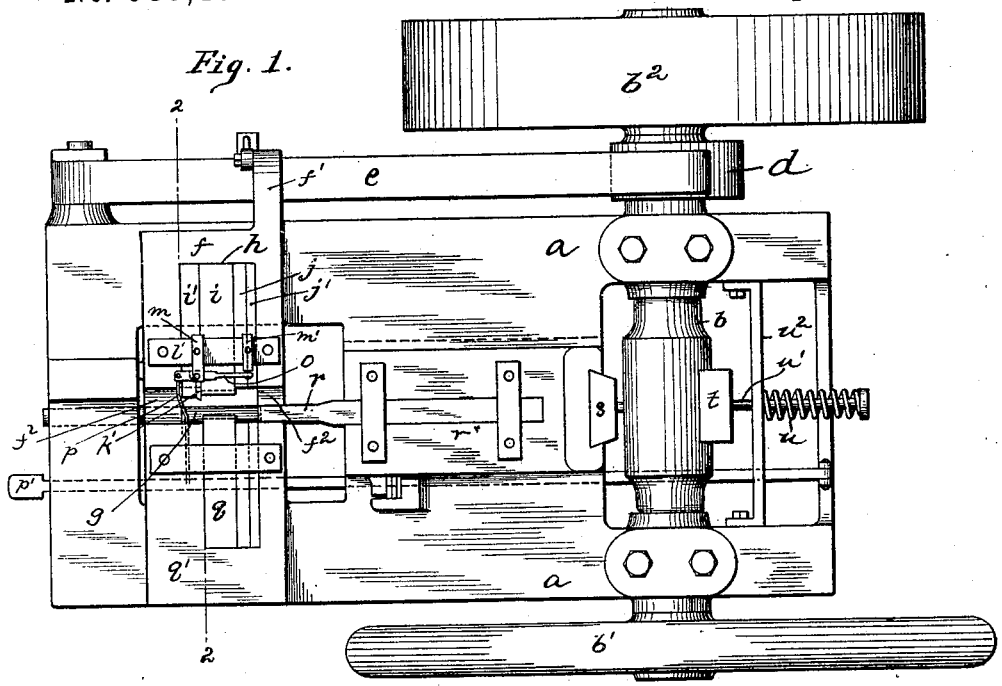
Figure 2:
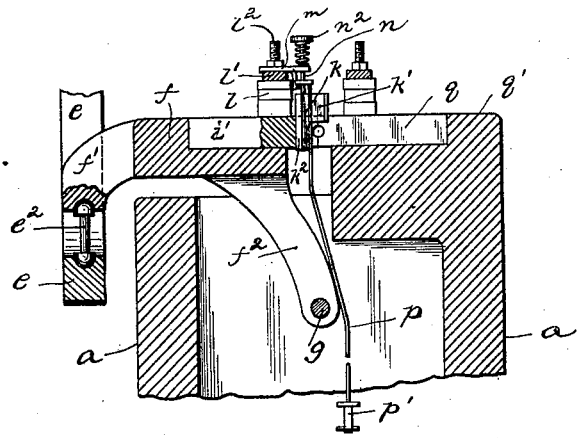
Figure 3:
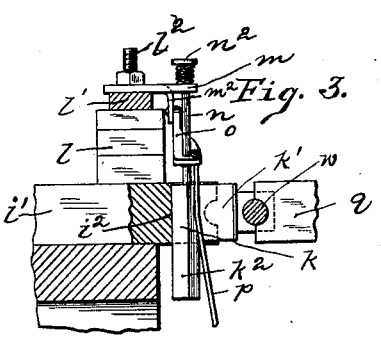

Figure 1 is a plan view of a bolt-machine with my invention applied thereto. Fig. 2 is a cross-section on line 2 2, Fig. 1. Fig. 3 is an enlarged view, partly in section, of the knife lowered. Fig. 4 is a side view of the machine. Fig. 5 is a perspective view of the knife and the manner of supporting same.

Like letters indicate like parts in each of the figures.

In the drawings, $a$ represents the frame of a suitable bolt-machine to which my invention may be applied. Journaled in suitable bearings in said frame is the shaft $b$, the flywheel $b'$ being mounted on one end thereof and the pulley-wheel $b^2$ on the other. The shaft $b$ has also the cam $d$ secured thereto, said cam engaging with the inner end of the rocker-shaft $e$ and moving in contact therewith. This rocker-shaft $e$ is pivoted at $e'$ to the frame $a$ and is connected by the link $e^2$ with the lug $f'$ of the die-carrier $f$. The die-carrier $f$ has the downwardly-extending arm $f^2$, which is journaled on the rod $g$. A recess $h$ is formed in the die-carrier to receive the die $i$ and knife-block $i'$. A space-block $j$ and wedge $j'$ hold said die and knife-block in position. The block $j'$ may be removed and a larger die inserted, if desired.

Fitting within a seat formed for it in the knife-block $i'$ is the knife $k$ with the blade $k'$. The knife $k$ has the downwardly-projecting arm $k^2$, which fits in the seat $i^2$ in the knife-block $i'$, said seat acting as a guide for the knife. This seat extends out to the end of the block $i'$ and supports the blade $k'$. The block $i'$ has the groove $i^3$, through which the rod from which the bolts are to be made passes. The blade $k'$ is normally above the plane of the dies and is supported in that position in the following manner: Supported on blocks $l$ is the plate $l'$, said blocks resting on the die-carrier $f$ and bolts $l^2$ passing down through said plate and blocks, whereby said plate is held firmly in place. Projecting from the plate $l'$ are the small plates $m$ $m'$, the plate $m'$ having the downwardly-extending portion $m^2$. A rod $n$, secured to the knife $k$, passes up through an opening in the plate $m$, a spring $n'$ being interposed between said plate and a head $n^2$ on said bolt. This spring acts to hold said knife normally in a raised position. An arm $o$ is pivoted at one end to the portion $m^2$ of the plate $m'$. The opposite end of said arm $o$ is twisted so as to be in a horizontal plane, and it has an opening through which the rod $n$ passes. The arm $o$ is rigidly secured to the rod $n$. A foot-lever $p$ is secured to the outer end of the arm $o$, said lever being operated by the treadle $p'$.

While I have described and illustrated the knife $k$ as above the dies, yet I do not wish to limit myself to any particular location of said knife.

Opposite the die $i$ is the stationary die $q$, suitably held in place in a recess in the die-block $q'$.

The header $r$ is mounted on the header-block $r'$, said block moving in suitable guides in the frame. At the rear end of the header-block $r'$ is a dovetailed seat to receive a block $s$. On the shaft $b$ is a knocker $t$, adapted upon each revolution of said shaft to strike the block $s$ and advance the header to strike the end of the bolt. The header is withdrawn by means of the spring $u$, surrounding the rod $u'$, secured to the header-block, and interposed between a head on said rod and an abutment $u^2$.

In the forming of a bolt by the above-described mechanism the operation is as follows: The rod from which the bolts are to be formed is first heated to a proper temperature and is fed by the operator to the dies. When the machine is in operation, the die $i$ moves to and fro while the die $q$ remains stationary. The header $r$ also advances on each revolution of the shaft $b$ to form the head. The operator gives the rod a quarter-turn each time the die $i$ withdraws, so that a smooth even shank is formed and at the same time the head of the bolt is squared by the pressure from the movable die-holder $f$ and the stationary die-holder $q'$. When the head of the bolt and shank have been properly formed, as the dies come together for the last blow the operator, with his foot on the treadle $p'$, lowers the knife $k$, bringing it into the position shown in Fig. 3. It is then in the plane of the dies, and as the die $i$ advances the knife-blade cuts the bolt from the rod $w$. With the bolt held between the dies in this way the knife can make a clean even cut. When the bolt has been cut, the operator removes his foot from the treadle, whereupon the knife resumes its normal position above the plane of the dies. The operator can at times proceed at once to form another bolt while the rod is still hot, thus doing away with the reheating each time a bolt is formed.

The operation of forming and cutting the bolt without removing it from the machine greatly reduces the time hitherto required to form and cut the bolts, while at the same time a more perfect bolt is obtained.

What I claim as my invention, and desire to secure by Letters Patent, is—

1. In a machine for forming bolts, rivets, &c., the combination with the dies and header and mechanism for operating the same, of a movable knife normally out of action, and mechanism for bringing said knife into position to cut the bolt from the blank, substantially as set forth.

2. In a bolt-machine, the combination with the dies and header and mechanism for operating same, of a knife normally above the plane of said dies, and mechanism for lowering said knife into position to cut the bolt, substantially as set forth.

3. In a bolt-machine, the combination with the dies and header and mechanism for operating same, of a knife supported normally above the plane of said dies, and connections between said knife and a lever for lowering said knife, substantially as set forth.

4. In a bolt-machine, the combination with the dies and header and mechanism for operating same, of a knife fitting in a seat in one of the die-holders and adapted to move up and down therein, a knife-blade above the plane of said dies, and mechanism for lowering said knife-blade in position to cut the bolt, substantially as set forth.

5. In a bolt-machine, the combination with the dies and header and mechanism for operating same, of a knife fitting in a seat in one of the die-holders, a rod connected to said knife, a support above said knife, said rod passing up through said support, a spring interposed between said support and a head on said rod, and connections between said rod and a treadle whereby said rod can be lowered, substantially as set forth.

6. In a bolt-machine, the combination with the dies and header and mechanism for operating same, of a knife having a downwardly-extending arm fitting in a seat in one of the die-holders and adapted to move up and down therein, a knife-blade above the plane of said dies, and mechanism for lowering said knife-blade in position to cut the bolt, substantially as set forth.

7. In a machine for forming bolts, rivets, &c., the combination with the dies and header and mechanism for operating same, of a knife having a downwardly-extending arm and a blade extending out from the upper end thereof, said arm fitting in a seat in one of the die-holders and the blade fitting in a portion of the same seat which extends out adjacent to the end of said blade, and mechanism for lowering said knife-blade in position to cut the bolt, substantially as set forth.

In testimony whereof I, the said CHARLES LANZ, have hereunto set my hand.

CHARLES LANZ.

Witnesses:
ROBT. D. TOTTEN,
ROBERT C. TOTTEN.